United States Patent [19]

Kowanz et al.

[11] Patent Number: 5,054,522
[45] Date of Patent: Oct. 8, 1991

[54] MICROVALVE

[75] Inventors: Bernd Kowanz, Linkenheim; Dirk Schmidt, Stutensee; Wolfgang Ehrfeld, Karlsruhe, all of Fed. Rep. of Germany

[73] Assignees: Burkert GmbH Werk Ingelfingen, Ingelfingen; Kernforschungszentrum Karlsruhe GmbH, Karlsruhe, both of Fed. Rep. of Germany

[21] Appl. No.: 527,194

[22] Filed: May 23, 1990

[30] Foreign Application Priority Data

May 29, 1989 [DE] Fed. Rep. of Germany ....... 3917396

[51] Int. Cl.$^5$ ..................... F16K 31/02; F16K 11/65
[52] U.S. Cl. .......................... 137/625.33; 251/129.01; 251/129.05; 137/625.28
[58] Field of Search ...................... 137/625.28, 625.33; 251/129.01, 129.05

[56] References Cited

U.S. PATENT DOCUMENTS 2,601,231 6/1952 Smith et al. ................... 137/625.33
4,530,317 7/1985 Schutten ..................... 251/129.01 X
4,781,220 11/1988 Smith ........................ 137/625.33 X Primary Examiner—Arnold Rosenthal
Attorney, Agent, or Firm—Sixbey, Friedman, Leedom & Ferguson

[57] ABSTRACT

A valve plate (14) provided with slot-like valve ports (16) is able to slide between two stationary valve plates (10 and 12) which are joined with each other and are provided with corresponding slot-like valve ports (16). A electrostatic drive is integrated in the valve plates (10, 12 and 14). It consists of strip-like electrodes (20 and 22) which are arranged opposite to corresponding electrodes of another valve plate. By the application of suitable actuating potentials with the same or opposite polarity to the electrodes of different valve plates the actuating forces may be produced, which are needed for moving the movable valve plate (14).

17 Claims, 5 Drawing Sheets

MICROVALVE

BACKGROUND OF THE INVENTION

The invention relates to microvalves and to method of manufacturing them.

The miniaturization of valves has led to the development of microvalves which owing the low inertia of their moving parts and short operating displacements offer an extremely short operating times, a low wear rate and a small power requirement of their drive. Microvalves, whose valve structures may have dimensions in the micron range, are furthermore characterized by a low internal and external dead volume and the possibility of highly precise metering.

As long as such microvalves are equipped with conventional electromagnetic drives limits are set to the degree of miniaturization which are due to the difficulties in connection with the assembly of macroscopic components on structures produced using microtechniques. There have thus been plans to develop microvalves which are equipped with piezoelectric or magnetostrictive drives or with a bimetallic drive.

However, even with such drive designs the fitting of the drive to the rest of the valve structure involves substantial difficulties, which are an obstacle to the intended goal of economic manufacture using mass production methods.

SHORT SUMMARY OF THE PRESENT INVENTION

One object of the invention is the creation of a microvalve with a low drive power, a high controllable flow rate, a geometry with favorable flow characteristics and short switching times.

A further aim of the invention is to provide such a microvalve which offers the advantages of rational mass production and assembly.

A still further aim of the invention is to provide a method for the manufacture of such a microvalve.

In order to achieve these or other objects appearing from the present specification, claims and drawings a microvalve in accordance with the invention has the following features:

(a) at least two valve plates with elongated valve ports are able to be moved in relation to each other in parallel planes between an open setting, in which the valve ports of the valve plates are aligned with each other, and a shut setting, in which the lands, provided between the valve ports of the one valve plate are opposite to the valve ports of the other valve plates shutting off such ports;

(b) the valve plates are provided on surfaces, which are opposite each other with a small distance therebetween, with strip-like electrodes;

(c) electrical potentials are able to be applied to the electrodes; and (d) the electrodes are aligned so as to be perpendicular to the direction of relative shifting of the valve plates.

The microvalve in accordance with the invention has an electrostatic drive. In order to produce such an electrostatic drive it is not necessary to provide any components in addition to the valve plates; it is in fact possible to integrate the electrostatic drive in or with the valve plates. The electrodes are formed on the valve plates themselves and it is possible to combine them in a wide variety of different manners with the preferably slot-like valve ports. The valve plates preferably each have a plurality of slot-like ports. The actuating force able to be produced by the electrostatic drive is dependent on the number of electrodes which cooperate with each other and on their length as measured in a direction perpendicular to the direction of motion. The electrodes placed opposite to each other form a capacitor of variable capacitance. In the case of its preferred forms, the invention therefore contemplates the provision of the greatest possible number of mutually cooperating electrode edges. By the application of opposite potentials attraction forces are produced, which have a component with the direction of the desired relative displacement between the valve plates as long as the strip-like electrodes of the two valve plates are not aligned opposite to each other. The simultaneously produced transverse components of the attraction forces may be either taken up by suitable low-friction bearings or may be compensated for by the arrangement of a movable valve plate between two stationary valve plates, whose electrodes are placed at the same potential.

The permissible operating potentials low enough to ensure that there is no electrical breakdown between the electrodes, may be increased by the interposition of an insulating layer so that potential values of over 200 V are possible, even although the electrodes are in sliding contact with each other with the interposition of an extremely thin insulating layer of for instance 1 $\mu$m. In the case of such designs the insulating layer is preferably made of a material which has a low coefficient of sliding friction.

The microvalve in accordance with the invention is also characterized by a particularly small space requirement. More especially, a very flat configuration is possible, since the valve plates may have a flat form and, besides the valve plates, it is only necessary to provide a housing for accommodating the same, in which the flow channels for the fluid whose flow is to be controlled, may be arranged in such a manner that the flow is not deflected.

A further advantage to be gained with the microvalve in accordance with the invention is that the dimensions of the drive may be selected to be independent of the valve ports so that adaption is readily possible to suit different requirements as regards the pressures and flow rates of the fluids to be controlled by the microvalve.

Owing to the very brief switching times of the microvalve in accordance with the invention it is possible to ensure very precise metering and also employ very high speed automatic control circuits.

Of the embodiments of the invention described in the ensuing account and covered by the claims particularly that form of the microvalve is to be emphasized in which the electrodes of each valve plate are divided up into a plurality of groups, which are offset in relation to each other by an amount which is equal to a fraction of the distance between adjacent electrodes in each group. Furthermore, the electrodes of the various groups are electrically insulated from each so that they may be driven by different drive potentials and at different points in time. This design of the invention means on the one hand that, if the strip-like electrodes of the valve plates are placed opposite to each other in a precisely aligned manner, there is no possibility of the plates dwelling in a metastable position; on the other hand driving the valve plates by means of alternating square wave potentials makes possible control of the direction of motion and a stepped operation in a number of switching stages, the provision of a number of groups of separately driven electrodes making it possible to obtain the desired number of switching steps.

Furthermore the invention provides a method for the production of a microvalve, more particularly one of the type described above, which is characterized by the following method steps:

(a) the valve plates of plastic with free parts left for the provision of the valve ports and for the electrodes are produced by deep x-ray lithography or plastic molding on an electrically conductive base plate;

(b) the valve ports are produced by a lacquer or wax which is distinctly more soluble than the plastic of the valve plates;

(c) free areas of the valve plates are electrolytically filled with a metal in order to form the electrodes;

(d) the surface of the valve plates is polished, the valve ports are exposed again and the polished surface of the valve plates is provided with an insulating layer; and (e) then the valve plates are detached from the base plate and mounted in a housing.

Deep x-ray lithography is a method, which is described in KfK-Nachrichten, year 19, 4/87, pages 167 through 179, and which is well suited to the production of a microvalve because minute structures may be produced with wall structures practically parallel to the direction of irradiation and extending for sufficient layer thicknesses. Deep x-ray lithography is performed using synchrotron radiation. Firstly a primary plastic mold is produced which is then filled electrolytically with a metal. The metal structure so produced is then used as a mold insert or pattern for the manufacture of secondary plastic molds, which during mass production take the place of the primary plastic mold. This procedure opens up the road to the mass production of minute microvalve structures, more especially for the microvalve as described above.

Further features and advantages of the invention will be gathered from the ensuing description of several embodiments thereof referring to the drawings.

DETAILED DESCRIPTION OF WORKING EMBODIMENTS OF THE INVENTION

Figure 1:
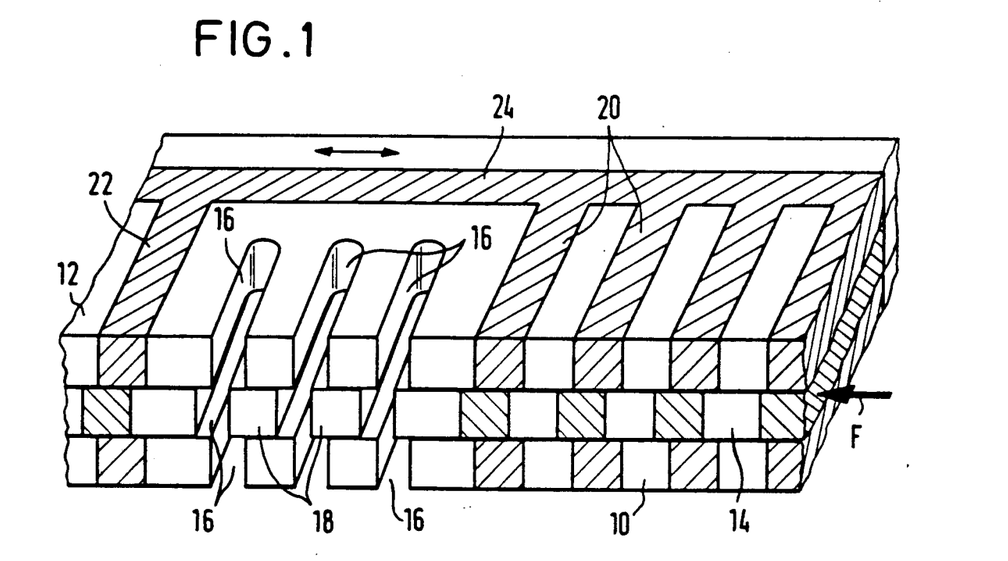
FIG. 1 is a diagrammatic perspective partial view of three valve plates of a first embodiment of the invention.

In the embodiment of the invention shown in FIG. 1 the microvalve comprises three valve plates: two mechanically linked, stationary valve plates 10 and 12 and one moving valve plate 14 placed between these plates. The valve plates 10 and 12 may be looked upon as "stator valve plates" and the valve plate 14 as an "armature valve plate".

The valve plates 10, 12 and 14 are provided with three slot-like ports 16. The valve ports 16 extend linearly and perpendicularly to the direction of relative sliding between the valve plates; this direction is indicated in FIG. 1 by a double arrow. All valve ports 16 have the same breadth and the same spacing from the respectively adjacent valve port. The distance between adjacent valve ports 16 is somewhat greater than the breadth of the valve ports. In FIG. 1 the valve ports 10, 12 and 14 are shown in an intermediate position, in which the separating lands 18 between the valve ports 16 of the valve plate 14 partly shut off the flow gap defined by the valve ports 16 of the valve plates 10 and 12. The valve plate 14 is able to be moved between an open setting, in which the valve ports of all valve plates are aligned with each other, and a shut setting, in which the lands 18 of the valve plate 14 shut off the valve ports 16 of the valve plates 10 and 12.

The actuating forces for displacement of the valve plate 14 are provided by an electrostatic drive. This drive is integrated in the valve plates 10, 12 and 14. It consists of strip-like electrodes, which are arranged at least on the facing surfaces of the valve plates 10, 12 and 14 with the same spacing between them and parallel to the valve ports 16 with a regular or pitch distance therebetween equal to the pitch distance between the valve ports 16.

In the design shown in FIG. 1 the valve plates 10, 12 and 14 consist of a non-conductive plastic or resin. In spaces corresponding to the electrodes metal has been deposited electrolytically. The electrodes are shaded in FIG. 1 and denoted by reference 20 on the one side of the valve ports 16 and, respectively, 22 on the other side of the valve ports. The electrodes 20 and 22 extend through the entire thickness of the valve plates 10, 12 and 14. At their ends they are respectively connected electrically with each other by printed wiring 24.

The valve plates 10, 12 and 14 are arranged, if especially low frictional loses are desired, at a small distance of not more than a few μm from each other. However designs are preferred in which at least one insulating layer is placed between two respective valve plates, such layer increasing the resistance to electrical breakdown so that high drive or operating potentials may be applied to the electrodes 20 and 22. Insulating layer materials are available which possess both the desired high resistance to electrical breakdown and a high dielectric constant and also a high resistance to mechanical wear and a low coefficient of sliding friction.

The manner of operation of the embodiment shown in FIG. 1 will now be described.

The oppositely placed electrodes 20 and, respectively, 22 of the valve plates 10, 12 and 14 respectively form a capacitor. Between the electrodes of each capacitor forces are present whose direction and size depend on the potentials applied to the electrodes.

In the case of the intermediate position of the valve plate 14, see FIG. 1, in relation to the valve plates 10 and 12 the strip-like electrodes 20 and 22 of the valve plate 14 are offset in relation to those of the valve plates 10 and 12 in the direction of the relative displacement. If now the electrodes 20 and 22 of the valve plates 10 and 12 have an identical electrical drive potential applied to them and an opposite electrical drive potential is applied to the electrodes of the valve plate 14, the attraction forces will be produced between the respectively opposite electrodes, such forces having components in the direction of the relative displacement and components perpendicular to this direction. The forces running perpendicular to the direction of the relative displacement are equal on size on the two sides of the valve plate 14, but they are opposite in direction so that they largely cancel each other out. The resulting forces act solely in the direction of the relative displacement and cause a movement of the valve plate 14 into the open setting, in which all the valve ports 16 are aligned with each other.

Under the effect of a return force F, produced for instance by a spring, there is movement of the valve plate 14 in the opposite direction as far as the shut setting in which the separating lands 18 prevent flow through the valve ports 16.

Figure 2:
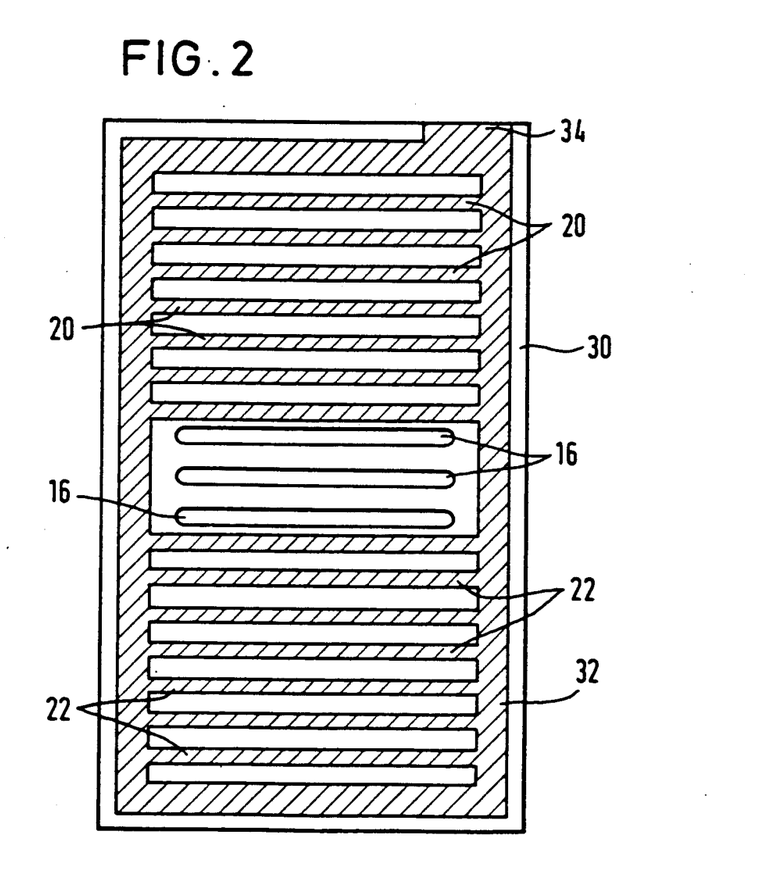
FIG. 2 is a plan view of the embodiment of the microvalve shown in FIG. 1.

FIG. 2 shows a complete valve plate in plan view. It will be seen from FIG. 2, that the area of the strip-like electrodes 20 and 22 is a multiple of the area of the two valve ports 16. Since the actuating forces are equal to the sum of the forces able to be produced by each individual electrode, the actuating force suitable for the respective requirement can be produced by selecting the number of electrodes, it being assumed that drive potentials of equal size will be applied, in the case of which there is no danger at all of breakdown or sparking between the electrodes. It will furthermore be readily apparent that the operating force produced will be proportional to the length of the strip-like electrodes so that there is further possibility of variation available for the designer since the length of the strip-like electrodes may be changed.

In the view shown in FIG. 2 of a valve plate 30 the ends of the strip-like electrodes 20 and 22 are connected with a connecting frame 32 surrounding the entire structure, and which on one side of the rectangular form of the valve plate is continued via a head 34 as far as an edge. It is at this edge that electrical contact may be made, as for instance by way of a contact spring or a contact wiper.

Figure 3:
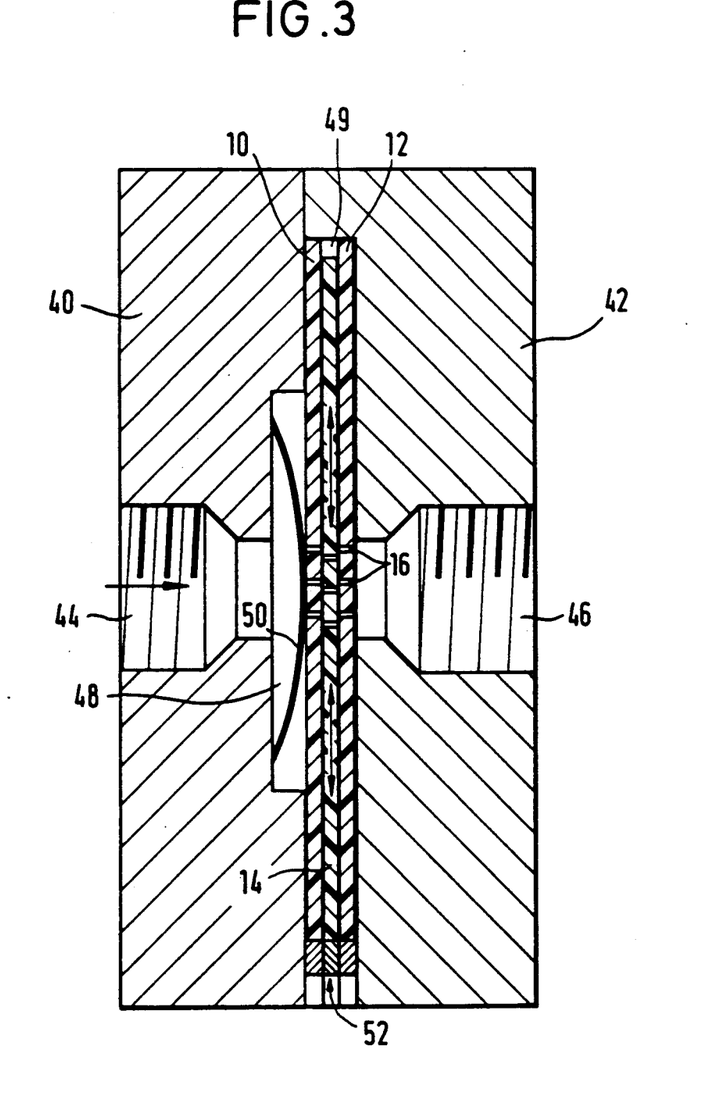
FIG. 3 is a diagrammatic sectional view of a microvalve with a housing.

FIG. 3 shows a complete microvalve with valve plates of the type shown in FIGS. 1 and 2, which are received in a recess in a housing made up of two parts 40 and 42. The three valve plates are referenced 10, 12 and 14 in a manner analogous to FIG. 1. The respective number of valve ports and their geometry and also the number and placement of the electrodes may be optimally adapted to the respective application for the valve, that is to say flow rate and opening pressure to be handled.

The two housing parts 40 and 42 have mutually aligned flow ducts 44 and 46 which opposite to the valve ports 16 open into a recess 49, which is located in that part 42 and in which the valve plates 10, 12 and 14 are accommodated. By means of a curved strip or leaf spring 50, which at one end bears against the inner wall face of a recess 48 in the part 40 and at the other end bears on the outer face of the valve plate 10, the valve plates 10, 12 and 14 are held pressed against each other with a slight biasing force. The electrical contacting of the electrodes of the various valve plates 10, 12 and 14 is in the part, referenced 52, of the lateral edges of these valve plates.

Figure 4:
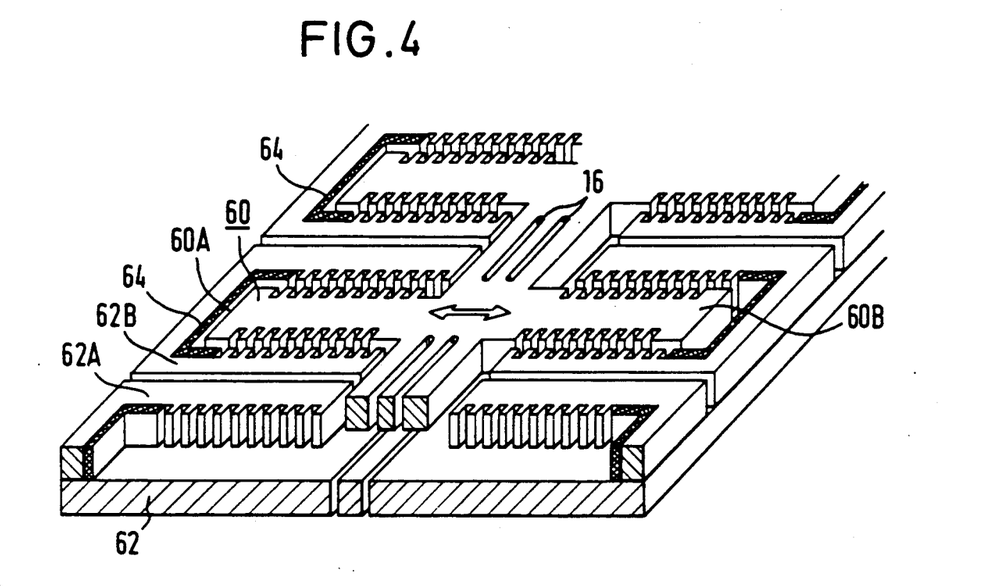
FIG. 4 is a diagrammatic partial perspective view of two valve plates of a further microvalve embodying the instant invention.
Figure 5:
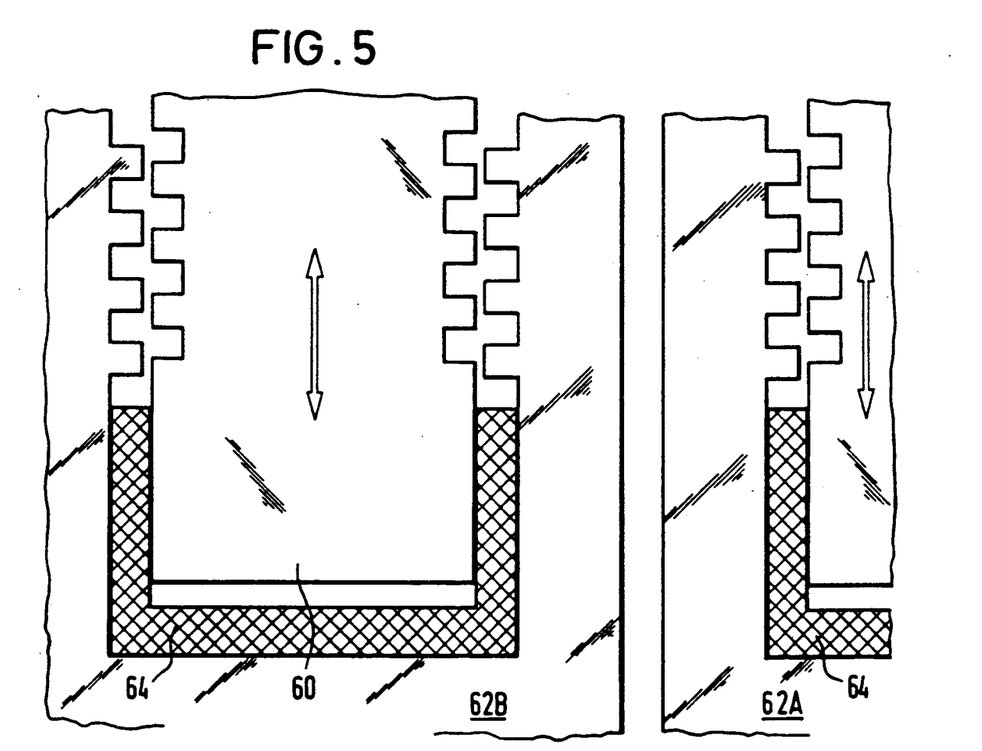
FIG. 5 is partial plan view on a greater scale of the valve plates shown in FIG. 4.

In the case of the embodiment shown in FIG. 4 an armature valve plate 60 is combined with a stator valve plate 62, which consists of a base plate 62A and an electrode plate 62B mounted thereon. Recesses are formed in the electrode plate 62B and in such recesses lateral heads 60A and 60B of the armature valve plate 60 are slidingly fitted. On the opposite surfaces, which are parallel to the direction of displacement as indicated by a double arrow, the heads 60A and 60B and the corresponding parts of the electrode plate 62B are provided with electrodes, which as may be seen from the plan view of FIG. 5, are like combs. The end of each tooth of the comb structure forms a electrode. The separation between adjacent electrodes is constituted by the space between adjacent teeth or projections of the comb structure. On the one hand the electrode structures form two groups, which are arranged with bilateral symmetry on the two sides of the slot-like valve ports 16, and on the other hand a number of groups on either side of the valve ports. It will furthermore be apparent that in the longitudinal direction of the valve ports 16 there is a plurality of sets of such valve ports arranged in pairs. The armature valve plate 60 is further provided with guide strips 64, which keep the lateral edges an the free end of the head 60A and, respectively, 60B at a constant and defined distance from the opposite walls of the electrode plate 62B.

The electrode plate 62B and the valve plate 60 consist of metal, which is electrolytically deposited in the intermediate molds of a plastic mold. Between the electrode plate 62B and the valve plate 60 preferably at least one insulating layer is provided in a way similar to the used in the case of the embodiment of FIG. 1.

The method in accordance with the invention for the production of microvalves of the above described manner has process steps involving deep x-ray lithography, galvanoforming and plastic molding, which are jointly referred to as the LIGA method in the KfK-Nachrichten year 19, 4/87, pages 167 through 179 and described therein in detail. The LIGA method makes possible the production of high precision microstructures of plastics, metals or structures in the form of metal-plastic composite material. Valve plate blanks are produced on an electrically conductive base plate and the blanks are provided with exposed or recessed areas by x-ray beam lithography or by plastic molding, such areas then corresponding to the valve ports and the electrode structure. The valve ports are then sealed off by means of a resist, which, as compared with the plastic material of the valve plate blank is readily soluble, i.e. distinctly more soluble than it is, or by means of a wax. The remaining free areas corresponding to the electrodes structures are then filled with a metal by means of electrolytic deposition. In the next step the surface of the valve plate blanks is then polished. Then the valve ports are freed again. Finally, the polished surface is provided with an insulating layer. The valve plate which is then finished may then be mounted in a housing with the necessary further valve.

Figure 6:
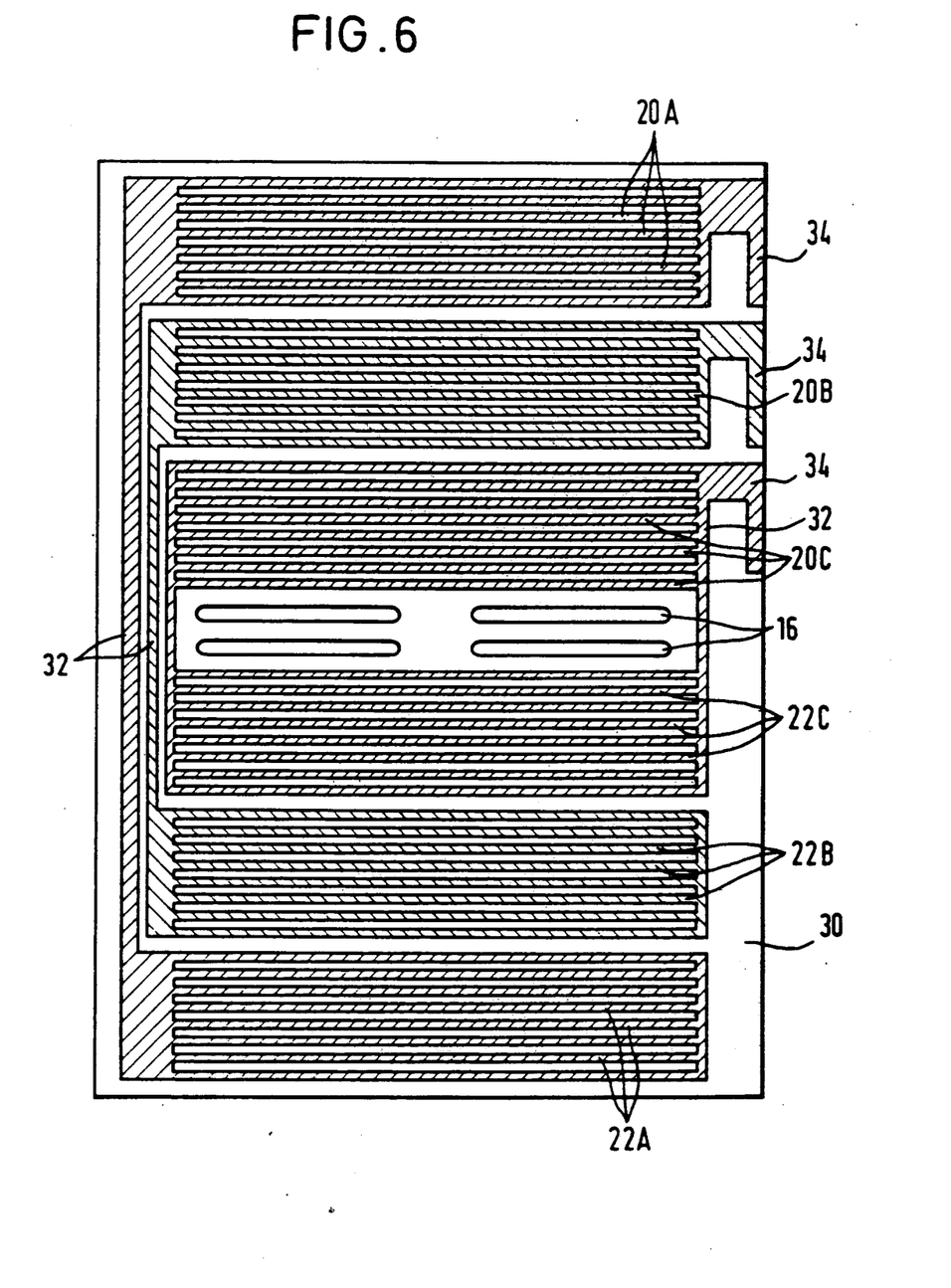
FIG. 6 is a plan view of a valve plate as a further development of the design of FIG. 2.

In the case of the stationary valve plate 30 of the invention to be seen in FIG. 6 the electrodes are arranged in three electrically separate groups 20A/22A, 20B/22B and 20C/22C. The electrode groups 20A, 20B and 20C are arranged on one side of the valve ports 16 and the electrode groups 22A, 22B and 22C on the other side of the valve ports. Electrodes in a given group are connected electrically with each other via printed wiring 32. The printed wiring extends via heads 34 as far as the edge of the valve plate, where the wiring is electrically contacted, for instance by means of a contact spring or a contact wiper. The operation of the individual electrode groups using suitable actuating potentials will now be described with reference to FIG. 7 taking a further embodiment of the invention as a basis, which is derived from the embodiment shown in FIGS. 4 and 5.

Figure 7:
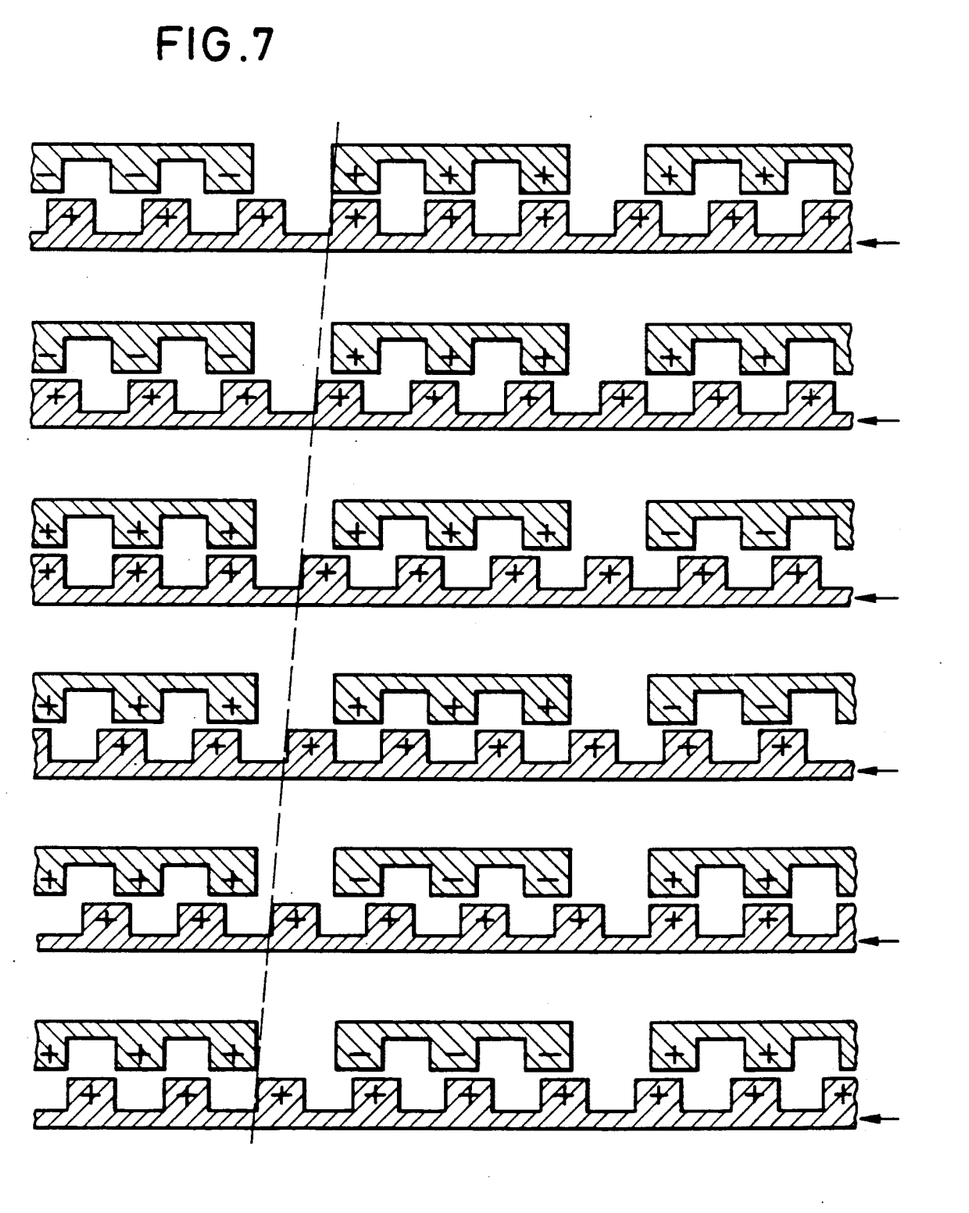
FIG. 7 is a diagram of operation of a microvalve by changing drive potentials.

In FIG. 7 the reader will see three electrode groups of a stationary valve plate and the electrodes of a moving valve plate in different states of operation. The figure has been simplified by showing only three electrodes in each electrode group, but this is only for convenience of illustration. The individual electrode groups are mutually offset by respectively one third of the electrode arrangement pitch and may be separately subjected to an actuating potentials. The polarities of the applied actuating potential are indicated at the respective electrodes. The moving valve plate has its electrodes connected with constant positive potential. The actuating potential supplied to the stationary electrode groups may be switched over for each group between positive and negative. The first case shown in FIG. 7 involves negative potential at the left, stationary electrode group and positive potential at the two other groups. Owing to the electrostatic attraction forces the movable valve plate will tend to so align itself in relation to the stationary valve plate that the electrodes of the moving plate and the electrodes of the left electrode group of the stationary valve plate will be opposite each other and aligned. In the case of the second case shown in FIG. 7 this condition has almost been reached. In the third case illustrated the electrodes of the moving group and the electrodes of the left group of the stationary valve plate are aligned opposite each other. The actuating voltage at the left electrode group will now be positive and in place of its a negative potential will be applied to the right hand electrode group. This causes an alignment of the moving valve plate towards the electrodes of the right group and thus further motion towards the left, as is shown in the fourth case. In the fifth case the alignment between the electrodes of the right group and the electrodes of the moving valve plate has been attained and positive potential is applied at the right group. A further displacement may now be achieved by application of negative potential to the middle electrode group. This is illustrated in the fifth and sixth cases. After the termination of this movement the initial position will be reached again as in the first case. Thus the moving valve plate will have been shifted through an entire electrode pitch distance. If the moving valve plate is to be further moved, the steps shown in the cases one to six may be repeated. In order to shift the moving valve plate to the right, the order of the actuation of the electrodes of the stationary valve plate has to be changed. In the case of actuation with the order left-middle-right the displacement of the valve plate takes place to the right.

In the case of a practical embodiment of a microvalve in accordance with FIGS. 1 through 3 and 6 the rectangular valve plates may have a size for instance of 20·15 mm², there being 900 electrodes with a length of 14 mm and a breadth of 10 μm for each valve plate. In the case of actuation with a voltage of 220 V an actuating force of 2.4 N will be produced in the case of the designs with one electrode group and 0.8N in the case of designs with three electrode groups. In the design of FIGS. 1 through 3 the return of the moving valve plate may be due to an external resetting movement, as for example one produced by a return spring. In the designs with a plurality of electrode groups the electrode groups of the stationary valve plate are mutually offset by respectively 6.67 μm in relation to each other and are operated by phase-shifted square pulses voltage. Owing to the arrangement and design of the electrodes in combination with the driving system the plates are prevented from dwelling in the metastable setting and it is possible to ensure that the direction of motion is clearly defined as in the case of a three-phase synchronous motor.

While the embodiments of the invention described above are single-way valves, it will be readily apparent to a man with usual skills in the art to produce multiway valves in accordance with the teachings of the invention. This can be simply achieved by suitably arranging the valve ports with respect to the flow ducts of the housing, without it being necessary to illustrate this possibility.

We claim:

1. A microvalve, comprising:
   (a) at least a first and a second valve plate each provided with elongated valve ports therethrough and with elongated lands between the valve ports, said valve plates being arranged mutually adjacent and movable with respect to each other substantially in perpendicular to said valve ports between an open setting, in which the valve ports of the first valve plate are aligned with the valve ports of the second valve plate, and a shut setting, in which the lands of the first valve plate are opposite to the valve ports of the second valve plate and the lands of the second valve plate are opposite to the valve ports of the first valve plate to thereby shut off said valve ports;
   (b) each of said first and second valve plate having surfaces which are opposite each other with a small distance therebetween and which are provided with strip-like electrodes thereon;
   (c) said electrodes being aligned substantially in perpendicular to the direction of motion of the valve plates; and
   (d) the electrodes of the first valve plate and of the second valve plate being adapted to be supplied with an electrical potential.

2. The microvalve as claimed in claim 1, wherein the breadth and the spacing of the strip-like electrodes from each other is approximately equal to or less than the actuation displacement of the first valve plate with respect to the second valve plate between the open setting and the shut setting.

3. The microvalve as claimed in claim 2, wherein the breadth and the spacing of the strip-like electrodes on the first valve plate are respectively equal to the breadth and the spacing of the strip-like electrodes on the second valve plate.

4. The microvalve as claimed in claim 1, wherein the electrodes of the first and the second valve plates are provided on the mutually opposite main planar surfaces of said first and second valve plates.

5. The microvalve as claimed in claim 1, wherein the electrodes are arranged on surfaces of the first and the second valve plates which are substantially perpendicular to the planes of said first and second valve plates, said second valve plate mounting an armature plate having a recess bordered by wall parts therein, said first valve plate being arranged in said recess, and the electrodes of said second valve plate being formed on said wall parts.

6. The microvalve as claimed in claim 5, wherein said first valve plate and said armature plate of the second valve plate are provided with mutually facing structures which in plane view have a comb-like structure having comb teeth and spaces therebetween, said electrodes being formed on the end faces of said comb teeth and the spaces between the comb teeth being filled with electrically insulating material.

7. The microvalve as claimed in any one of claims 1 to 4, further comprising a third valve plate, said first and third valve plates being held stationary and said second valve plate being arranged movably between said first and third valve plates, and said movable second valve plate being provided with electrodes on its two main planar surfaces, such electrodes of the second valve plate being arranged respectively opposite to electrodes of the first and the third stationary valve plates.

8. The microvalve as claimed in claim 1, wherein at least one insulating layer is arranged between the first and the second valve plates.

9. The microvalve as claimed in claim 7, wherein a first insulating layer is arranged between the first and the second valve plate and a second insulating layer is arranged between the second and the third valve plates.

10. The microvalve as claimed in claim 1, wherein the electrodes of each valve plate are arranged in at least two groups of electrodes, mutually offset with respect to each other, said groups of electrodes being electrically insulated from each other and being adapted to be separately connected with actuating potentials.

11. The microvalve as claimed in claim 10, wherein the size of the offset of said groups of electrodes is equal to a fraction of the spacing between electrodes in each group.

12. The microvalve as claimed in claim 11, wherein the said fraction of the spacing is approximately equal to $\frac{1}{2}$.

13. The microvalve as claimed in claim 10, wherein the actuating potentials to be applied to the electrodes are symmetrical square wave AC potentials.

14. The microvalve as claimed in claim 13, wherein the electrodes of one of said first and second valve plates are connected with a fixed potential and the electrodes of the other of said first and second valve plates are connected to a square wave potential of alternating polarity.

15. The microvalve as claimed in either claim 1 or 5, further comprising a housing provided with a recess and with flow ducts opening into the recess, said first and second valve plates being accomodated in said recess, and said housing being provided with electrical contacting means for making contact with the electrodes of said first and second valve plates.

16. The microvalve as claimed in claim 15, wherein the valve ports of said first and second valve plates and the flow ducts of said housing are arranged in order to produce a two-way valve.

17. The microvalve as claimed in claim 15, wherein the valve ports of said first and second valve plates and the flow ducts of said housing are arranged in order to produce a multi-way valve.

* * * * *